June 16, 1931.  J. A. GRAY  1,810,168
MOTION PICTURE SCREEN
Filed Aug. 2, 1929
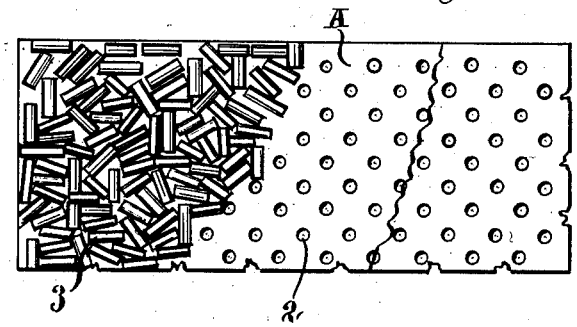
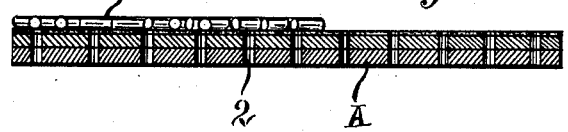
INVENTOR
James A. Gray
BY
ATTORNEY Patented June 16, 1931

1,810,168

UNITED STATES PATENT OFFICE

JAMES A. GRAY, OF ST. PAUL, MINNESOTA

MOTION PICTURE SCREEN

Application filed August 2, 1929. Serial No. 383,079.

My invention relates to motion picture screens, and has for its object to provide a screen with an exterior layer of glass objects, as solid cylinders placed upon the screen in varying positions, so that the varying positions and the varying angles of the cylinders will bring about the maximum of reflected and refracted light, and thereby increase to the maximum extent the field of screen illumination.

I am aware that it is old to coat screens with a layer of minute glass beads to reflect a greater amount of light projected upon the same than in the ordinary screens, but, I have found, that in the use of glass beads, due to the regularity of reflective surfaces and the restricted condensation of light within the beads, there in such restriction in the angles of reflection as to cause insufficient illumination when viewed from the sides of the screen.

By my improved invention, hereinafter particularly described, I greatly extend the range of illumination.

These and other features of the invention will be more particularly described in the following description and accompanying drawings, wherein:

Figure 1 is a plan view of a section of screen constructed according to my invention; and Figure 2 is a sectional view, partly broken away.

Referring to the drawings in detail, I utilize for the background, a suitable character of fabric screen A, such as is ordinarily sold for screen purposes, forming, however, the screen fabric with perforations 2 to permit the sound being transmitted, as in talking pictures.

In carrying out my invention, the screen A is covered with a suitable adhering coating, as lacquer, and, before this lacquer sets, it is covered with oblong solid glass cylinders 3. These cylinders are very small and are preferably blown upon the face of the lacquered surface of the screen before the lacquer sets, so that, as the lacquer hardens, they will be held by said lacquer in all sorts of varying positions, as indicated in the drawing. After the cylinders are blown upon the screen fabric, and before the lacquer hardens, I preferably run a roll over the cylinders to place them in a flat-wise position upon the screen fabric.

The preferred size of these solid glass cylinders is about one-sixty-fourth of an inch in diameter, and about one-sixteenth of an inch long.

In use, with these glass cylinders, constituting the facing of the screen, lying in all sorts of varying flat-wise positions upon the fabric, the light thrown against the face of the screen is condensed in the usual manner and reflected therefrom at the different angles of both the end walls and the circular walls of the cylinders. As will be apparent, with the end walls of the cylinders facing other adjacent cylinders at all sorts of varying angles, there will be the extreme of variation, both in the angles of the rays of reflection and in the angles of the rays of refraction in rays passing from one cylinder to another cylinder and being then reflected and refracted. By reason of the light being reflected and refracted from every conceivable angle, the field of illumination is materially spread beyond the sides of the screen.

The fabric screen forming the backing sheet for the glass cylinders being of very pliable material, and the cylinders themselves being of minute size, the screen may be kept in a flexible and pliable condition throughout its life and readily rolled up and placed out of the way when not in use.

I have found that with the use of my particular form of coating for the face of the screen, I not only greatly extend the field of illumination, but bring about the illumination with the minimum amount of light. These two advantages are of particular value in connection with picture screens. My character of screen facing, formed of glass cylinders, materially longer than they are thick, lends itself also particularly to perforated screen backings, as will be apparent from the drawing, a most desirable advantage in connection with the present vogue of talking pictures.

I claim:

1. A motion picture screen, comprising a fabric backing, an adhesive dressing applied thereto, and a covering layer of solid glass cylinders imbedded in and applied to said adhesive coating and positioned thereon at varying angles.

2. A motion picture screen, comprising a fabric backing, an adhesive dressing applied to the face thereof, and a coating layer of relatively long, solid glass cylinders applied to said dressing in flat-wise position, and at varying angles.

3. The process of manufacturing a motion picture screen consisting of coating the face of the screen backing with an adhesive material, covering said adhesive material with a mass of minute, solid glass cylinders before the adhesive material is set, and then applying pressure over said cylinders to place them in a flat-wise position and at varied angles in adherence to said adhesive material.

4. A motion picture screen, comprising a backing member of flexible material, and a coating of transparent, cylindrical, glass particles adhesively secured to one face of said backing member.

5. A coating for a projection screen, comprising a multiplicity of small clear glass cylindrical particles.

6. The process of manufacturing a projection screen which comprises coating one face of a screen backing with an adhesive material, and of covering the face so treated with a mass of minute cylindrical glass particles before the adhesive material has set, and of thereafter permitting the adhesive material to set to adhesively secure the particles in contact with said adhesive material to said adhesive material.

In testimony whereof I affix my signature.

JAMES A. GRAY.